US010996493B2

(12) United States Patent
Kleinert

(10) Patent No.: US 10,996,493 B2
(45) Date of Patent: May 4, 2021

(54) OPTOELECTRONIC COMPONENTS AND METHOD FOR PRODUCING AN OPTOELECTRONIC COMPONENT

(71) Applicant: Fraunhofer-Gesellschaft zur Förderung der angewandten Forschung e.V., Munich (DE)

(72) Inventor: Moritz Kleinert, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/462,390

(22) PCT Filed: Nov. 24, 2017

(86) PCT No.: PCT/EP2017/080344
§ 371 (c)(1),
(2) Date: May 20, 2019

(87) PCT Pub. No.: WO2018/096099
PCT Pub. Date: May 31, 2018

(65) Prior Publication Data
US 2019/0324296 A1    Oct. 24, 2019

(30) Foreign Application Priority Data
Nov. 25, 2016 (DE) ..................... 10 2016 223 455.2

(51) Int. Cl.
*G02F 1/01*      (2006.01)
(52) U.S. Cl.
CPC .................................. *G02F 1/011* (2013.01)
(58) Field of Classification Search
None
See application file for complete search history.

(56) References Cited

U.S. PATENT DOCUMENTS

2003/0053729 A1    3/2003 Shi
2003/0152329 A1    8/2003 Sugama et al.
(Continued)

FOREIGN PATENT DOCUMENTS

EP    2584397 A1    4/2013
EP    2696227 A1    2/2014
(Continued)

OTHER PUBLICATIONS

Koester et al., "Waveguide-Coupled Graphene Optoelectronics", IEEE Journal of Selected Topics in Quantum Electronics, 2014, pp. 1-11, vol. 20, No. 1.
(Continued)

*Primary Examiner* — Tina M Wong
(74) *Attorney, Agent, or Firm* — The Webb Law Firm

(57) ABSTRACT

An optoelectronic component includes an optical waveguide including at least one passive and at least one active section. The active section has at least one layer formed from a two-dimensional material. The layer composed of the two-dimensional material is arranged at least partly in a waveguide core of the active section or in a manner at least partly adjoining the waveguide core of the active section. The difference in refractive index relative to the same wavelength between a core material forming the waveguide core of the active section and a cladding material forming a waveguide cladding of the active section is greater than the difference in refractive index between a core material forming a waveguide core of the passive section and a cladding material forming a waveguide cladding of the passive section.

13 Claims, 5 Drawing Sheets

(56) References Cited

U.S. PATENT DOCUMENTS

| | | |
|---|---|---|
| 2013/0101247 A1 | 4/2013 | Cho et al. |
| 2014/0023321 A1 | 1/2014 | Lu et al. |
| 2014/0056551 A1 | 2/2014 | Liu et al. |
| 2014/0105553 A1 | 4/2014 | Kim et al. |
| 2014/0341496 A1 | 11/2014 | Kim et al. |
| 2019/0324296 A1* | 10/2019 | Kleinert .................. G02F 1/011 |

FOREIGN PATENT DOCUMENTS

| | | |
|---|---|---|
| JP | 2016161890 A | 9/2016 |
| WO | 2016154764 A2 | 10/2016 |

OTHER PUBLICATIONS

Liu et al., "Double-Layer Graphene Optical Modulator", Nano Letters, 2012, pp. 1482-1485, vol. 12.

Pospischil et al., "CMOS-compatible graphene photodetector covering all optical communication bands", Nature Photonics, 2013, pp. 892-896, vol. 7.

Kleinert et al., "Graphene-based electro-absorption modulator integrated in a passive polymer waveguide platform", Optical Materials Express, 2016,, pp. 1800-1807, vol. 6, No. 6, Germany.

\* cited by examiner

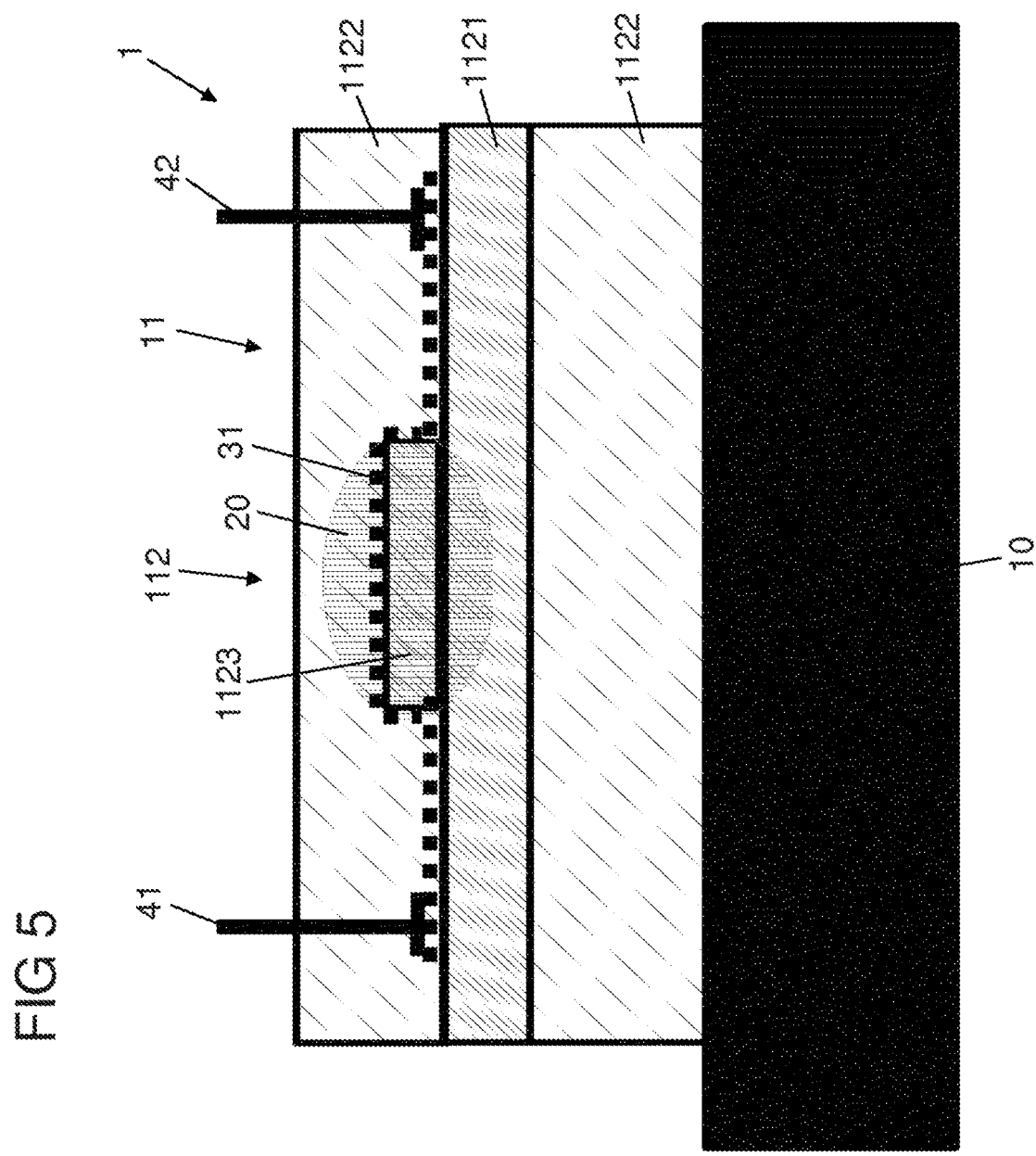

OPTOELECTRONIC COMPONENTS AND METHOD FOR PRODUCING AN OPTOELECTRONIC COMPONENT

CROSS-REFERENCE TO RELATED APPLICATIONS

This application is the United States national phase of International Application No. PCT/EP2017/080344 filed Nov. 24, 2017, and claims priority to German Patent Application No. 10 2016 223 455.2 filed Nov. 25, 2016, the disclosures of which are hereby incorporated by reference in their entirety.

BACKGROUND OF THE INVENTION

Field of the Invention

The disclosure relates to optoelectronic components, and a method for producing an optoelectronic component.

Technical Considerations

Two-dimensional materials of such optoelectronic components consist of an almost monoatomic or monomolecular layer in a characteristic arrangement. Such materials have fundamentally different properties than conventional three-dimensional crystals composed of the same atoms or molecules with a different structure. Particularly interesting properties of the two-dimensional materials are their high mechanical strength and, from an electro-optical standpoint, a band gap that can be adjusted e.g. from 0 eV to a plurality of eV by applying a voltage. Consequently, the two-dimensional materials can be used to realize e.g. photodetectors and light modulators for very wide wavelength ranges. One known two-dimensional material is graphene, which is based on carbon atoms and which is produced e.g. on copper carriers and detached from the latter after production.

In order to form optoelectronic components, layers composed of a two-dimensional material are integrated in particular into optical waveguides. In this regard, EP 2 584 397 A1, for example, discloses an optical waveguide comprising a silicon core forming a rib structure, wherein a layer of graphene is placed over the rib structure. With this arrangement, the intensity maximum of the waves guided in the waveguide is at a distance from the graphene layer, however. Moreover, the light modes propagating in the waveguide have a distinctively different diameter than modes in optical fibers composed of glass that are used to couple light into and out of the component. High coupling losses can occur as a result.

SUMMARY OF THE INVENTION

The proposed solution addresses the problem of realizing firstly the best possible guidance of a light wave and secondly a coupling of the component to an optical fiber composed of glass in a manner that exhibits the least possible losses.

This problem is solved by the provision of the optoelectronic components having features as described herein, and also by the method for producing an optoelectronic component having features as described herein.

Accordingly, an optoelectronic component is provided, comprising
an optical waveguide comprising at least one passive and at least one active section, wherein the active section has at least one layer formed from a two-dimensional material (and provided in particular with a contact), wherein the layer composed of the two-dimensional material is arranged at least partly in a waveguide core of the active section or in a manner at least partly adjoining the waveguide core of the active section, and wherein the difference in refractive index relative to the same wavelength between a core material forming the waveguide core of the active section and a cladding material forming a waveguide cladding of the active section is greater than the difference in refractive index between a core material forming a waveguide core of the passive section and a cladding material forming a waveguide cladding of the passive section.

As a result of the greater difference in refractive index in the active section of the waveguide, a light wave experiences a stronger guidance there than in the passive waveguide section. This has the consequence that the light wave has a smaller extent in the active section and thus a higher intensity in the center of the waveguide, i.e. in the region of the layer composed of the two-dimensional material. Consequently, this increases the efficiency of the interaction of the light wave with the two-dimensional material and hence the efficiency of the entire component. At the same time, the light wave experiences a weaker guidance in the passive section, which results in a larger extent of the light wave in this region. This in turn reduces coupling losses between the optoelectronic component and an optical fiber composed of glass via which the light wave is coupled into the component and/or out of the component. The waveguide core of the active section is arranged in the waveguide cladding in particular such that it is embedded into the cladding material on both sides (i.e. with its top side and underside).

Furthermore, the layer composed of the two-dimensional material is positioned in the waveguide core of the active section in particular such that the core material in each case at least partly covers two mutually opposite sides of the layer, i.e. the core material adjoins a top side and an underside of the layer composed of the two-dimensional material. It is also conceivable, however, for the layer composed of the two-dimensional material to adjoin the core material only on one side, i.e. the core material is situated only on one side of the layer. Here the layer composed of the two-dimensional material may be positioned between the core material and the cladding material. In particular, the layer composed of the two-dimensional material at least partly (in particular directly) adjoins a top side or underside of the waveguide core of the active section. In this regard, the layer can adjoin the core material for example directly from the top or bottom. The top side and the underside of the waveguide core are formed in particular by a side of the waveguide core facing away from a substrate and a side of the waveguide core facing a substrate, respectively.

Furthermore, the core material of the active section differs in particular from the core material of the passive section and/or the cladding material of the active section differs from the cladding material of the passive section. Possible materials for forming the core material of the active and of the passive section, respectively, and for forming the cladding material of the active and of the passive section, respectively, are explained further below.

In accordance with another configuration of the solution, the active section of the optical waveguide is embodied in a strongly guiding fashion and the passive section of the optical waveguide is embodied in a weakly guiding fashion. The difference in refractive index between the core material and cladding material of the active section may be at least 0.2, at least 0.3 or at least 0.4. The difference in refractive index between the core material and cladding material of the passive section may be at most 0.1 or at most 0.05. The core material and the cladding material (e.g. a polymer or doped or undoped silicon dioxide) of the passive region each may have a refractive index of between 1.40 to 1.55, wherein the refractive index of the core material is greater than the refractive index of the cladding material.

It is furthermore possible for the core material of the active section to be structured for laterally guiding a light wave. The core material of the active section may have a rib or strip structure. In particular, it is thereby possible to form a so-called "single mode" (monomode) waveguide.

It is additionally conceivable for the active section of the waveguide (in particular the difference in refractive index there between the core material and the cladding material) to be embodied such that the light wave guided in this region has a diameter of less than 3 µm or less than 2 µm (e.g. between 2 and 3 µm). By contrast, the passive section of the waveguide (in particular in the region of a facet of the waveguide) can be embodied such that the light wave guided there has a diameter of at least 3 µm or at least 5 µm (e.g. between 5 and 10 µm).

It is then also possible for the layer composed of two-dimensional material to project laterally from the waveguide core at least in one direction of the lateral plane and the projecting part of the layer to be electrically contacted via a metal contact at a distance from the guided optical wave. It is thus possible to avoid losses of the guided optical wave as a result of the metal contact.

In accordance with another development of the solution, the core material of the active section extends into the passive section of the waveguide, wherein the extent of the core material perpendicular to the longitudinal direction, i.e. the width and/or the height, of the optical waveguide decreases with distance from the active section. The extent of the core material may decrease continuously with distance from the active section (from the layer composed of the two-dimensional material) over a span of at least 30 µm or at least 50 µm. This embodiment serves for the lossless transformation of optical modes of the passive and active sections of the waveguide.

The guidance of the light waves through the core material of the active section becomes weaker and weaker as a result of the tapering of the core toward the passive section, wherein the diameter of the light waves increases more and more until finally the passive section fully undertakes the guidance. It is conceivable for the continuous tapering of the core material, for technological simplification, at least predominantly to be restricted to that region of the core material which extends below or above the layer composed of the two-dimensional material. It is also possible for the width and/or the thickness of the core material not to tend continuously down to zero, rather a residual width and/or thickness, i.e. a step, can be present in each case at the ends of the core material.

It is also conceivable for the cladding material of the active section to shape at least one part of the core material of the passive section, i.e. for the cladding material of the active section to be at least partly identical with the core material of the passive section. In particular, the core material of the passive section extends continuously (integrally) both in the passive section and in the active section, wherein in the active section, as mentioned, it forms the waveguide cladding of the active section. The core and cladding layers of the active and passive sections of the waveguide are arranged in particular on a common carrier. The component may be part of a waveguide platform which is e.g. a constituent of a larger arrangement. The waveguide platform may be integrated into a waveguide network or a sensor system.

The two-dimensional material may consist of one atomic layer or of a maximum of ten atomic layers. The two-dimensional material may be formed from graphene, triazine-based graphitic carbon nitride, germanene, molybdenum disulfide, molybdenum diselenide, silicene and/or black phosphorus or comprises at least one of these materials, specifically in each case in one and a plurality of atomic layers.

The active section of the waveguide (i.e. the active section of the component) is embodied e.g. as a photodetector. For this purpose, one layer (e.g. composed of graphene) may be composed of the two-dimensional material is present and correspondingly connected up. In particular, the layer composed of the two-dimensional material is provided with two electrical contacts. Light guided in the optical waveguide is at least partly absorbed by the two-dimensional material, wherein a resulting photocurrent can be measured via the contacts.

It is also possible for the active section to be embodied as a light modulator, wherein in particular at least two layers each composed of a two-dimensional material are present, which are electrically insulated from one another by a dielectric. It is conceivable for the core material of the active section of the waveguide simultaneously also to form the dielectric. In particular, the two layers composed of the two-dimensional material are connected to contacts (in particular composed of a metal) which are electrically insulated from one another and via which a voltage can be applied to the layers. The contacts are situated in particular outside the extent of a light wave guided in the active section of the waveguide. What is realized, in particular, is a longitudinal transmission of radiation through the layers composed of the two-dimensional material, in which the layers are arranged parallel to the longitudinal direction of the optical waveguide.

The optoelectronic component can also be coupled to an optical fiber composed of glass, wherein an end side of the optical fiber composed of glass is connected to a facet of the component (of the optical waveguide); e.g. by adhesive-bonding or latching connection.

The component may be operated in a wavelength range of 0.4 µm to 1.7 µm, 0.82 µm-0.87 µm, 0.97 µm-1.070 µm, 1.26 µm-1.36 µm and/or 1.5 µm-1.65 µm.

In a further aspect, the solution relates to an optoelectronic component, embodied in particular as explained above, comprising an optical waveguide comprising at least one active section having at least one layer formed from a two-dimensional material, wherein the layer composed of the two-dimensional material is arranged at least partly in a waveguide core of the active section or in a manner at least partly adjoining the waveguide core of the active section, and wherein the active section comprises a cladding material at least partly surrounding the core material, wherein the refractive index of a core material forming the waveguide core of the active section relative to visible light lies in the range of 1.9 to 2.5 and the refractive index of the cladding material lies in the range of 1.4 to 1.55.

The core material of the active section may be a dielectric formed from a nitride, an oxide and/or a silicate. The dielectric comprises for example silicon nitride, titanium dioxide, hafnium dioxide, hafnium silicate, zirconium silicate, zirconium dioxide and/or aluminum dioxide or is formed from these materials.

Furthermore, the core material of the active section can have a thickness of at least 50 nm, at least 100 nm or at least 200 nm or in the range of 50 to 500 nm or 100 to 200 nm.

In accordance with another configuration, the cladding material of the active section comprises silicon dioxide and/or a polymer and/or the cladding material of a passive section of the waveguide comprises silicon dioxide and/or a polymer.

The core material of a passive section of the waveguide may comprise a polymer (e.g. having a refractive index of between 1.4 and 1.55) and/or doped silicon dioxide, and/or the cladding material of the passive section comprises a polymer and/or silicon dioxide. The polymer can be formed by an acrylate, an ormocer, a spin-on-glass polymer or silicone (in each case e.g. having a refractive index of 1.40 to 1.55 or 1.44 to 1.49).

It goes without saying that the optoelectronic component of the second aspect of the solution can additionally also have features explained above of the optoelectronic component of the first aspect of the solution. In this regard, the optical waveguide in particular also comprises a passive section besides the active section. It is also possible for two layers each composed of a two-dimensional material to be present, which are electrically insulated from one another by a dielectric. Furthermore, it is possible to use the above-mentioned materials for forming the layer composed of the two-dimensional material.

Conversely, the optoelectronic component of the first aspect of the solution can contain features explained above in relation to the second aspect of the solution. This concerns, for example, the core and cladding materials for forming the passive and active sections of the waveguide as mentioned in relation to the second aspect of the solution.

The solution also relates to a method for producing an optoelectronic component, in particular as described above, comprising the following steps:

producing an optical waveguide comprising at least one active and at least one passive section, wherein producing the optical waveguide comprises arranging at least one layer formed from a two-dimensional material at least partly in a waveguide core of the active section or in a manner at least partly adjoining the waveguide core, wherein the optical waveguide is produced such that the difference in refractive index relative to the same wavelength between a core material forming the waveguide core of the active section and a cladding material forming a waveguide cladding of the active section is greater than the difference in refractive index between a core material forming a waveguide core of the passive section and a cladding material forming a waveguide cladding of the passive section.

BRIEF DESCRIPTION OF THE DRAWINGS

The solution is explained in greater detail below on the basis of embodiments with reference to the figures, in which:

FIG. 5 schematically shows a sectional view through the active section of an optoelectronic component in accordance with a further embodiment.

DESCRIPTION OF THE INVENTION

Figure 1:
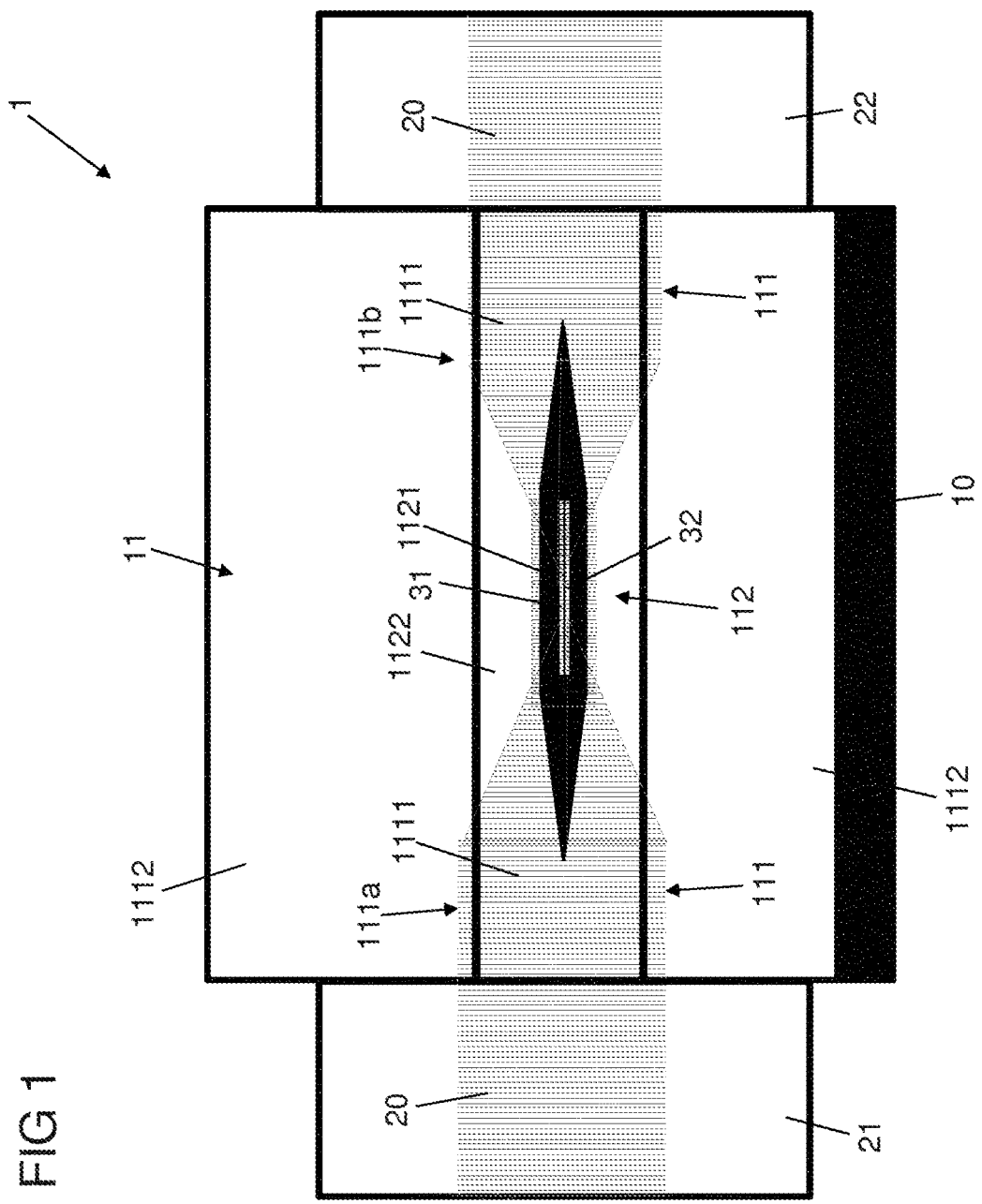
FIG. 1 schematically shows a lateral sectional view of an optoelectronic component in accordance with one embodiment.

The optoelectronic component 1 according to the solution as illustrated in FIG. 1 comprises an integrated optical waveguide 11 arranged on a substrate 10, wherein a first end of the optical waveguide 11 is coupled to a first optical fiber 21 composed of glass and a second end of the waveguide 11 is coupled to a second optical fiber 22 composed of glass. By way of example, a light wave 20 (vertically hatched region in FIG. 1) is coupled into the optical waveguide 11 via the first optical fiber 21 composed of glass and is coupled out of the waveguide 11 via the second optical fiber 22 composed of glass.

The optical waveguide 11 has an active section 112 and a passive section 111, wherein, in the exemplary embodiment in FIG. 1, one partial section 111a of the passive section 111 is situated upstream of the active section 112, i.e. between a facet of the component 1 that is coupled to the first optical fiber 21 composed of glass and the active section 112, and another partial section 111b is situated downstream of the active section 112, i.e. between the active section 112 and a facet of the component 1 that is coupled to the second optical fiber 22 composed of glass.

The active section 112 of the waveguide 11 is distinguished by the fact that in its waveguide core 1121 two layers 31, 32, each consisting of a two-dimensional material (e.g. graphene), are embedded, specifically in such a way that a core material of which the waveguide core 1121 of the active section 112 consists also extends between the layers 31, 32 and electrically insulates the layers 31, 32 from one another. The core material thus extends in a manner respectively adjoining two mutually opposite sides of the layers 31, 32.

The active section 112 is considered to be, in particular, that region of the waveguide 11 in which the layers 31, 32 are situated. Nevertheless, the core material of the waveguide core 1121 extends into a waveguide core 1111 both of the front and of the rear partial section 111a, 111b of the passive section 111, wherein in the example both the thickness and the height of the core material decrease continuously toward the outside (away from the layers 31, 32). This specific lateral structuring of the core material of the active section is readily discernible in FIG. 2, in particular. The likewise laterally structured waveguide core 1111 of the passive section 111 extends in turn in a manner adjoining the waveguide core 1121 into the active section 112 of the waveguide 11 and forms there a waveguide cladding 1122 of the active section 112. The tapering of the core material of the waveguide core 1121 into the passive section 111 serves for reducing coupling losses between the passive and active sections 111, 112.

The waveguide core 1111 of the passive section 111 is surrounded by a waveguide cladding 1112, wherein the cladding material of the cladding 1112 extends continuously from the front partial section 1111a of the passive section 111 via the active section 112 as far as the end of the rear partial section 1111b of the passive section 111.

The active section 112 has different light guiding properties than the passive section 111 of the waveguide 11. In particular, the materials of the waveguide claddings 1112 and 1122 of the passive and active sections 111, 112 and also the core materials of the waveguide cores 1111 and 1121 are different. Furthermore, these materials are chosen such that the difference in refractive index between the core material of the waveguide core 1121 and the material of the cladding 1122 of the active section 112 is greater than the difference in refractive index between the material of the core 1111 and the material of the cladding 1112 and the passive section 111.

In particular, the differences in refractive index of the passive and active sections 111, 112 are such that the active section 112 is embodied in a strongly light-guiding fashion and the passive section is embodied in a weakly light-guiding fashion. This has the consequence that the light wave 20 guided in the optical waveguide 11 has a larger extent in the passive section 111 than in the active section 112, as illustrated in FIG. 1. In particular, the extent of the light wave 20 in the passive partial sections 111a, 111b is in each case comparable with the extent of the light wave in the optical fibers 21, 22 composed of glass, such that the coupling losses between the optical fibers 21, 22 composed of glass and the waveguide 11 are as low as possible.

Figure 4:
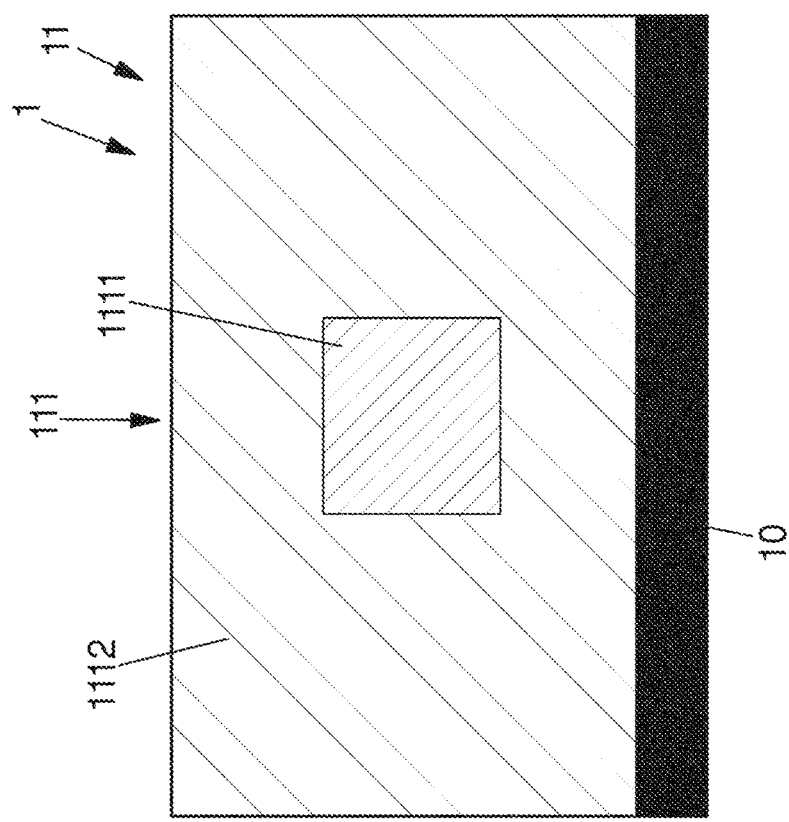
FIG. 4 shows a sectional view through the component from FIG. 1 in the region of the passive section.

On account of the strong guidance by the active section 112 of the waveguide 11, the light wave has a reduced cross section here, as a result of which it has a higher intensity in the central region of the active section 112 and thus in the region of the layers 31, 32 composed of the two-dimensional material. Accordingly, this also results in a stronger effect of the light wave on the layers 31, 32 and thus a better efficiency of the interaction between the light wave and the layers 31, 32. A lateral guidance of the light wave in the active section 112 is produced by virtue of the fact that the waveguide core 1121 forms a rib 1123. The material of the cladding 1122 laterally adjoins the rib 1123; cf. FIG. 3, which shows a sectional view perpendicular to the waveguide 11 through the active section 112. By contrast, the waveguide core 1111 of the passive region 111 has an at least approximately rectangular or square cross section, as is illustrated in the sectional view through the passive section 111 in FIG. 4.

The core material of the waveguide core 1121 of the active section 112 is for example a dielectric (e.g. silicon nitride), wherein the core material in particular also extends between the two layers 31, 32. However, it is also conceivable for a different dielectric to be used as electrically insulating material between the layers 31 and 32 compared with that used for the rest of the waveguide core 1121. A polymer, for example, is suitable as material of the cladding 1112 which is identical to the material of the core 1111 of the passive section 111. The cladding 1112 of the passive section 111 is e.g. likewise formed from a polymer. In particular, materials are used which result in a refractive index (relative to visible light or some other operating wavelength of the optoelectronic component) of the material of the core 1121 of the active section 112 in the range of 1.9 to 2.5 and a refractive index of the cladding material of the active section 112 in the range of 1.4 to 1.55.

Figure 2:
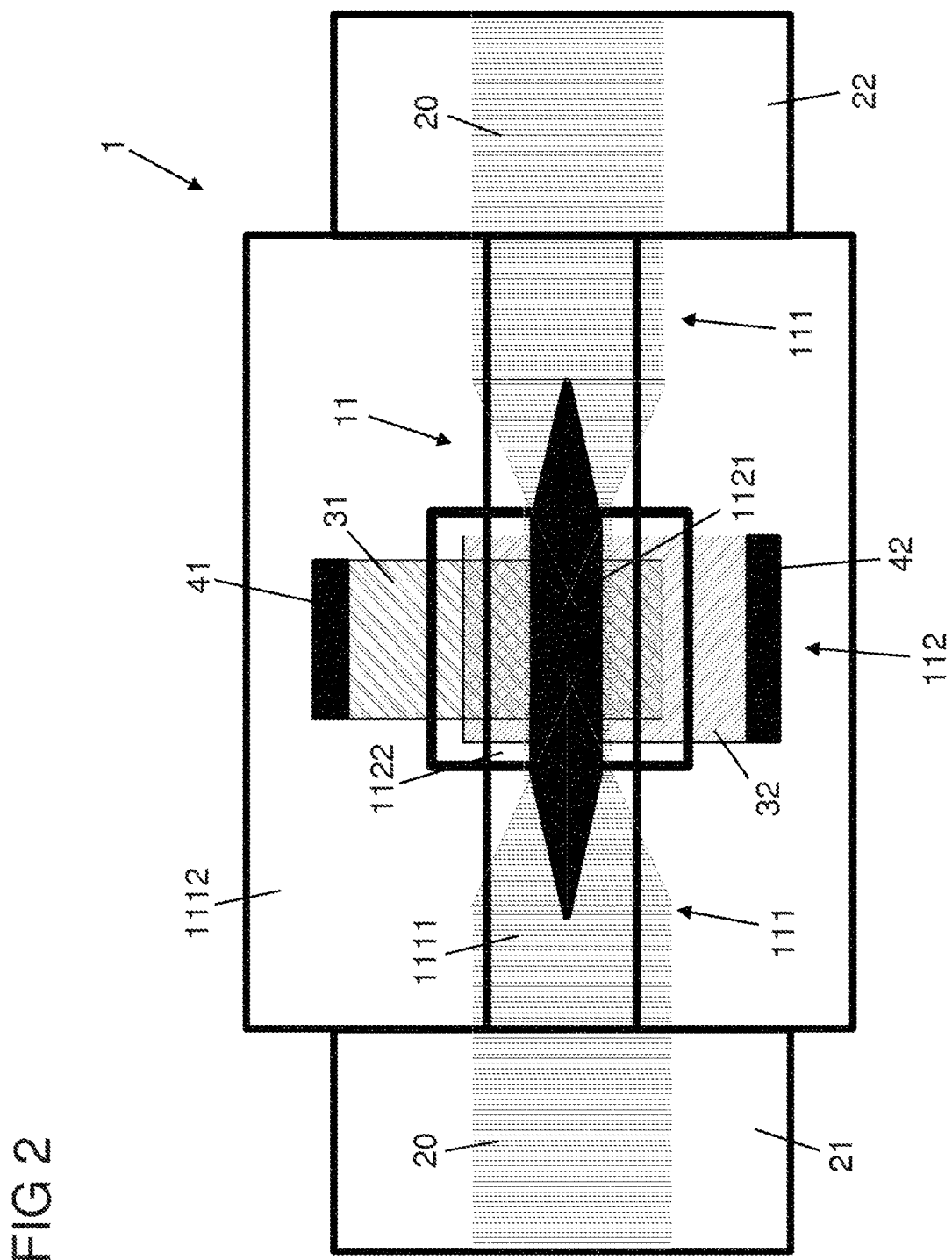
FIG. 2 shows the component from FIG. 1 in a partly transparent view from above.
Figure 3:
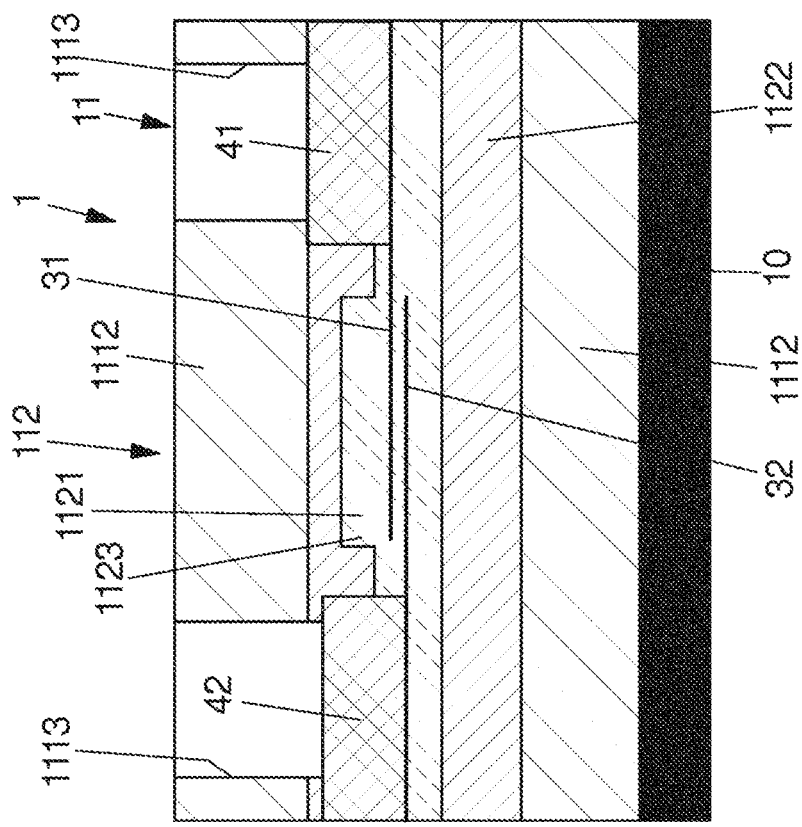
FIG. 3 shows a sectional view through the component from FIG. 1 in the region of the active section.

As shown in the plan view of the optoelectronic component 1 in FIG. 2 and in FIG. 3, the layers 31, 32 composed of the two-dimensional material are provided with metal contacts 41, 42, via which an electrical voltage is able to be coupled to the layers 31, 32 and a light modulator is able to be realized in this way. The contacts 41, 42 are respectively arranged on a portion of the layers 31, 32 which projects laterally from the waveguide core, wherein above the contacts 41, 42 cutouts 1113 are situated in the waveguide cladding 1112 of the passive section, via which cutouts the contacts 41, 42 are accessible. The metal contacts 41, 42 are thus at sufficient distance from the guided wave to avoid light losses.

Figure 6:
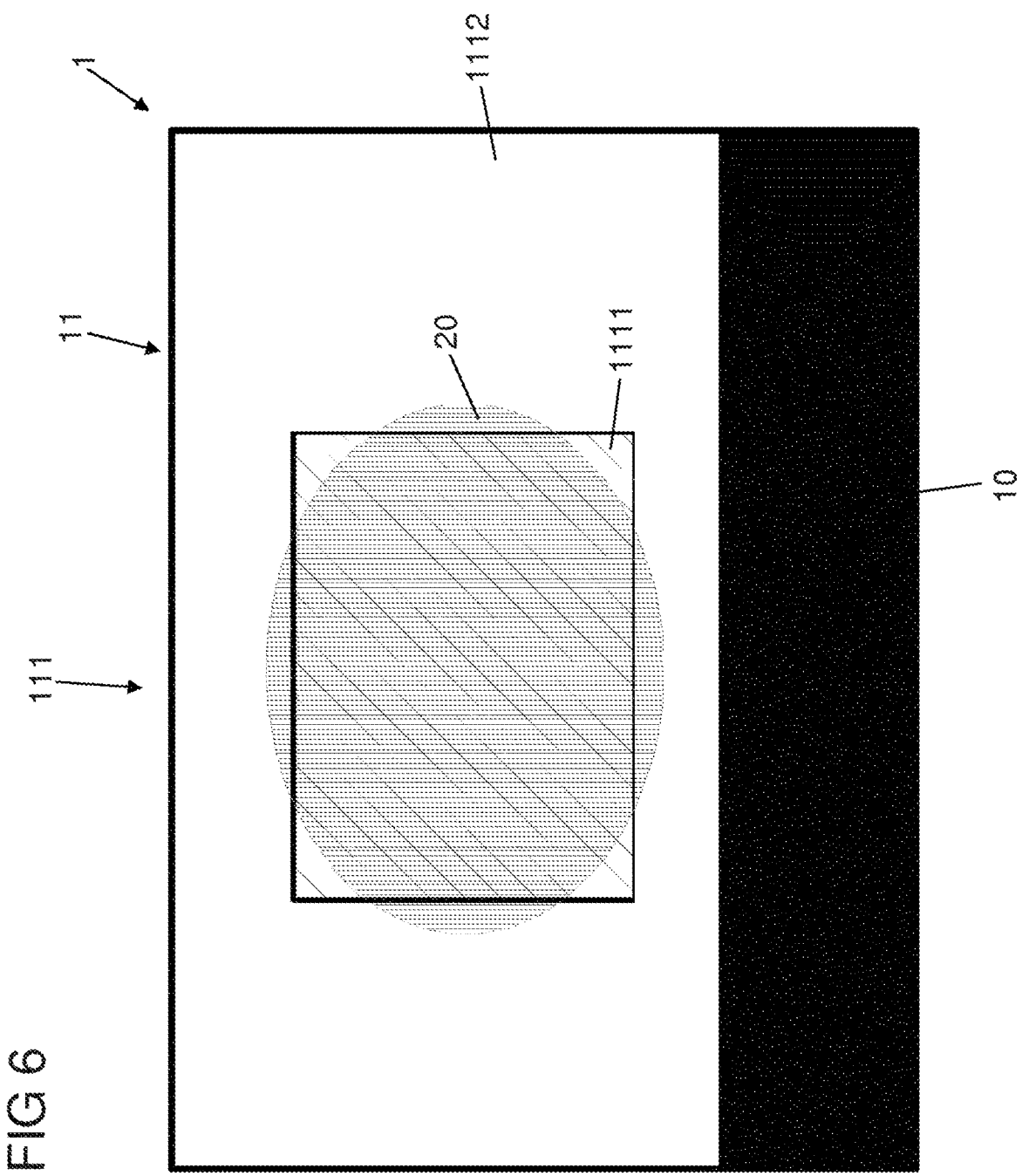
FIG. 6 shows a sectional view through the passive section of the component from FIG. 5.

A further embodiment of the optoelectronic component 1 according to the solution is illustrated in FIGS. 5 and 6. This component also comprises a passive and an active section 111, 112, wherein FIG. 5 shows a sectional view through the active section 112 and FIG. 6 shows a sectional view through the passive section 111. Unlike in the previous exemplary embodiments, only one layer 31 composed of a two-dimensional material is present, which moreover is not situated in the waveguide core 1121 of the active section 112, but rather is arranged in a manner adjoining the waveguide core 1121. More precisely, the layer 31 extends across a rib 1123 of the waveguide core 1121 and extends in each case laterally with respect to the rib 1123 as far as contacts 41, 42, via which e.g. a photocurrent generated in the layer 31 is measurable and the component 1 is thus operable as a photodetector. The contacts 41, 42 are positioned such that they lie outside the optical wave 20 guided in the active section 112.

The invention claimed is:

1. An optoelectronic component, comprising:
    an optical waveguide comprising at least one passive and at least one active section, wherein
    the active section has at least one layer formed from a two-dimensional material, wherein the layer formed of the two-dimensional material is arranged at least partly in a waveguide core of the active section or in a manner at least partly adjoining the waveguide core of the active section, and
    a difference in refractive index relative to the same wavelength between a core material forming the waveguide core of the active section and a cladding material forming a waveguide cladding of the active section is greater than a difference in refractive index between a core material forming a waveguide core of the passive section and a cladding material forming a waveguide cladding of the passive section.

2. The optoelectronic component as claimed in claim 1, wherein the core material of the active section is structured for laterally guiding a light wave coupled into the waveguide.

3. The optoelectronic component as claimed in claim 1, wherein at least the active section forms a monomode waveguide.

4. The optoelectronic component as claimed in claim 1, wherein the layer formed of the two-dimensional material projects laterally from the waveguide core at least in one direction and the projecting layer is electrically contacted at a distance from the guided optical wave.

5. The optoelectronic component as claimed in claim 1, wherein the core material of the active section differs from the core material of the passive section, and/or the cladding material of the active section differs from the cladding material of the passive section.

6. The optoelectronic component as claimed in claim 1, wherein at least one of:
    the active section of the optical waveguide is embodied in a strongly guiding fashion and the passive section of the optical waveguide is embodied in a weakly guiding fashion, and
    the active section of the waveguide is embodied such that a light wave guided there has a diameter of less than 3 µm or less than 2 µm, and/or the passive section of the waveguide is embodied such that the light wave guided there has a diameter of at least 3 µm or at least 5 µm.

7. The optoelectronic component as claimed in claim 1, wherein the difference in refractive index between the core material and the cladding material of the active section is at least 0.2, at least 0.3, or at least 0.4, and/or the difference in refractive index between the core material and the cladding material of the passive section is at most 0.1 or at most 0.05.

8. The optoelectronic component as claimed in claim 1, wherein the core material of the active section extends into the passive section, wherein the extent of the core material perpendicular to the longitudinal direction of the optical waveguide decreases with distance from the active section.

9. The optoelectronic component as claimed in claim 8, wherein the extent of the core material decreases continuously with distance from the active section over a span of at least 30 µm or at least 50 µm.

10. The optoelectronic component as claimed in claim 1, wherein the cladding material of the active section shapes at least one part of the core material of the passive section.

11. The optoelectronic component as claimed in claim 1, wherein at least one of:
the two-dimensional material consists of one atomic layer or of a maximum of ten atomic layers, and
the two-dimensional material is formed from graphene, triazine-based graphitic carbon nitride, germanene, molybdenum disulfide, molybdenum diselenide, silicene, and/or black phosphorus or comprises at least one of these materials.

12. The optoelectronic component as claimed in claim 1, wherein the active section has at least two layers each formed of a two-dimensional material, which are electrically insulated from one another by a dielectric.

13. A method for producing an optoelectronic component, comprising:
producing an optical waveguide comprising at least one passive and at least one active section, wherein
producing the optical waveguide comprises arranging at least one layer formed from a two-dimensional material at least partly in a waveguide core of the active section or in a manner at least partly adjoining the waveguide core of the active section, and wherein
the optical waveguide is produced such that a difference in refractive index relative to the same wavelength between a core material forming the waveguide core of the active section and a cladding material forming a waveguide cladding of the active section is greater than a difference in refractive index between a core material forming a waveguide core of the passive section and a cladding material forming a waveguide cladding of the passive section.

* * * * *